United States Patent
Marchese et al.

(10) Patent No.: US 11,803,201 B1
(45) Date of Patent: Oct. 31, 2023

(54) DYNAMIC CURRENT SCALING OF A REGULATOR

(71) Applicant: STMICROELECTRONICS S.r.l., Agrate Brianza (IT)

(72) Inventors: Carmela Marchese, Milan (IT); Rossella Bassoli, Monza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/741,994

(22) Filed: May 11, 2022

(51) Int. Cl.
*G06F 1/32* (2019.01)
*G05F 1/10* (2006.01)
*G06F 1/3206* (2019.01)

(52) U.S. Cl.
CPC .............. *G05F 1/10* (2013.01); *G06F 1/3206* (2013.01)

(58) Field of Classification Search
CPC .................................................... G06F 1/3206
See application file for complete search history.

(56) References Cited

U.S. PATENT DOCUMENTS

| | | | |
|---|---|---|---|
| 7,822,967 B2 | 10/2010 | Fung | |
| 8,463,973 B2 | 6/2013 | Naffziger et al. | |
| 9,213,381 B2 | 12/2015 | Osborn et al. | |
| 2004/0123170 A1* | 6/2004 | Tschanz | G06F 1/3296 713/320 |
| 2004/0257048 A1* | 12/2004 | Chagny | H02J 7/007182 320/141 |
| 2005/0046400 A1 | 3/2005 | Rotem | |
| 2008/0244294 A1* | 10/2008 | Allarey | G06F 1/3203 713/320 |
| 2021/0303045 A1 | 9/2021 | Leung et al. | |

OTHER PUBLICATIONS

STMicroelectronics, "300 mA very low quiescent current linear regulator IC with the automatic green mode," LD39130S, DocID025199 Rev. 2, Jan. 2015, 27 pages.
STMicroelectronics, "300 mA very low quiescent current linear regulator IC with the automatic green mode," LD39130S, DS9919 Rev. 7, Nov. 2020, 33 pages.

* cited by examiner

*Primary Examiner* — Stefan Stoynov
(74) *Attorney, Agent, or Firm* — SEED IP LAW GROUP LLP

(57) ABSTRACT

A method and apparatus for performing dynamic current scaling of an input current of a voltage regulator are provided. The method and apparatus allow tuning current consumption in various applications, calculating a duration of an activity phase in which various algorithms are executed and activating dynamic current scaling of a regulator if the activity duration is shorter than a programmable threshold. A controller receives a threshold for an activity duration and a window size in which to evaluate the activity duration.

20 Claims, 6 Drawing Sheets

DYNAMIC CURRENT SCALING OF A REGULATOR

BACKGROUND

Technical Field

This application is directed to dynamically scaling a current of a regulator and, in particular, dynamically scaling the current based on an activity duration of a controller powered by the regulator.

Description of the Related Art

Regulators are used to supply voltage having a substantially constant level. Regulators receive an input current and supply the voltage based on the received current. In many applications, such as low-power applications including activity trackers and pedometers, computational activity varies over time. Further, in the applications, reducing the current supplied to a regulator results in achieving power savings.

BRIEF SUMMARY

In an embodiment, a system includes a regulator configured to receive an input current and provide a regulated voltage. The system includes a controller configured to receive a threshold for an activity duration; determine a first activity duration in a first output data rate period of a plurality of output data rate periods; compare the first activity duration with the threshold for the activity duration; in response to determining that the first activity duration exceeds the threshold, refrain from performing dynamic current scaling on the input current in the first output data rate period; and in response to determining that the first activity duration does not exceed the threshold, cause the dynamic current scaling to be performed on the input current in the first output data rate period.

In an embodiment, the controller is configured to cause the dynamic current scaling to be performed in the first output data rate period by reducing the input current from a first current level to a second current level that is lower than the first current level. In an embodiment, the controller is configured to cause the dynamic current scaling to be performed in the first output data rate period by reducing the input current from the first current level to the second current level in a first standby duration of the first output data rate period. In an embodiment, the first standby duration is subsequent to the first activity duration in the first output data rate period.

In an embodiment, the first standby duration is a portion of the first output data rate period during which the controller does not perform one or more algorithm scheduled during the first output data rate period. In an embodiment, the first activity duration is a portion of the first output data rate period during which the controller performs one or more algorithm scheduled during the first output data rate period.

In an embodiment, the controller is configured to refrain from performing the dynamic current scaling by retaining the input current at a first current level during both the first activity duration and a first standby duration of the first output data rate period. In an embodiment, the controller is configured to: receive an indication of a window size; determine that the window size is greater than one; in response to determining that the window size is greater than one, determine whether one or more activity durations of one or more output data rate periods, respectively, of the plurality of output data rate periods each do not exceed the threshold; and in response to determining that the one or more activity durations and the first activity duration each do not exceed the threshold, cause the dynamic current scaling to be performed on the input current in the first output data rate period. In an embodiment, the first output data rate period is subsequent to the one or more output data rate periods. In an embodiment, the regulated voltage powers the controller.

In an embodiment, a controller for a regulator includes memory configured to store executable instructions for execution during a first activity duration of a first output data rate period. The controller includes a control stage configured to: receive a threshold for activity duration; determine a first timestamp before executing the executable instructions; execute the executable instructions; determine a second timestamp after executing the executable instructions; determine the first activity duration as a difference between the first and second timestamps; compare the first activity duration with the threshold; and determine whether to reduce a current supplied to the regulator based on comparing the first activity duration with the threshold. In an embodiment, the controller includes a dynamic current scaling stage configured to set the current supplied to the regulator.

In an embodiment, the control stage is configured to reduce the current supplied to the regulator from a first current level to a second current level in response to determining that the first activity duration is less than the threshold. In an embodiment, the control stage is configured to reduce the current supplied to the regulator in a first standby duration of the first output data rate period. In an embodiment, the first standby duration is subsequent to the first activity duration.

In an embodiment, the dynamic current scaling stage is configured to increase the current supplied to the regulator in a second activity duration of a second output data rate period from the second current level to the first current level. In an embodiment, the second output data rate period is subsequent to the first output data rate period. In an embodiment, the control stage is configured to retain a level of the current supplied to the regulator in response to determining that the first activity duration is greater than the threshold. In an embodiment, the control stage is configured to retain the level of the current supplied to the regulator in a first standby duration of the first output data rate period. In an embodiment, the first standby duration is subsequent to the first activity duration.

In an embodiment, a method includes receiving a threshold for an activity duration; determining a first activity duration in a first output data rate period of a plurality of output data rate periods; comparing the first activity duration with the threshold for the activity duration; and in response to determining that the first activity duration exceeds the threshold, refraining from performing dynamic current scaling on an input current of a regulator in the first output data rate period, and in response to determining that the first activity duration does not exceed the threshold, causing the dynamic current scaling to be performed on the input current in the first output data rate period.

In an embodiment, causing the dynamic current scaling to be performed in the first output data rate period includes reducing the input current from a first current level to a second current level that is lower than the first current level. In an embodiment, causing the dynamic current scaling to be performed in the first output data rate period includes reducing the input current from the first current level to the second current level in a first standby duration of the first output data rate period. In an embodiment, the first standby duration is subsequent to the first activity duration in the first output data rate period.

In an embodiment, the first activity duration is a portion of the first output data rate period during which a controller executes one or more algorithm scheduled for execution during the first output data rate period. In an embodiment, refraining from performing the dynamic current scaling includes retaining the input current at a first current level during both the first activity duration and a first standby duration of the first output data rate period.

In an embodiment, the method includes receiving an indication of a window size; determining that the window size is greater than one; in response to determining that the window size is greater than one, determining whether one or more activity durations of one or more output data rate periods, respectively, of the plurality of output data rate periods each do not exceed the threshold; and in response to determining that the one or more activity durations and the first activity duration each do not exceed the threshold, causing the dynamic current scaling to be performed on the input current in the first output data rate period. In an embodiment, the first output data rate period is subsequent to the one or more output data rate periods.

DETAILED DESCRIPTION

Figure 1:
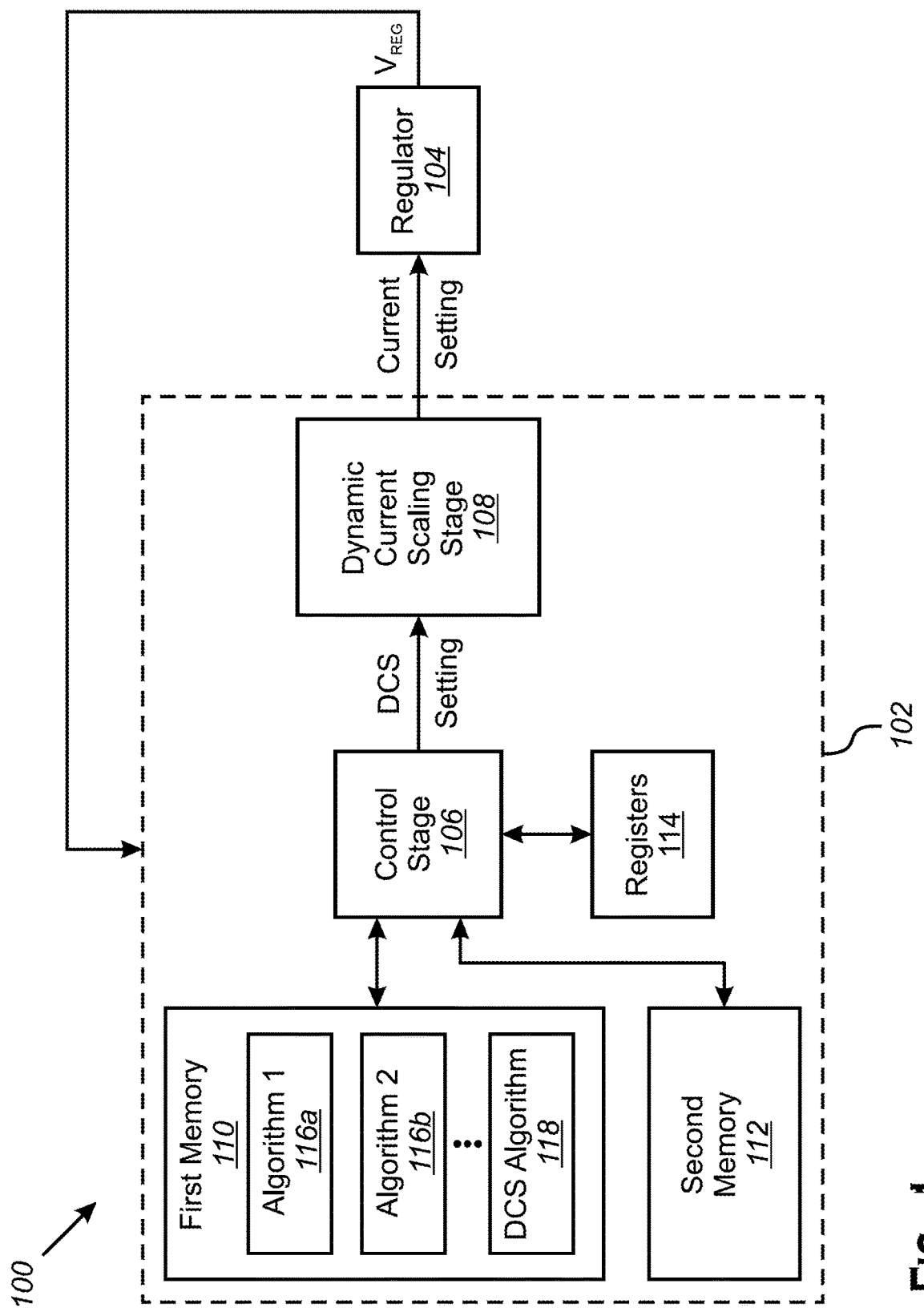
FIG. 1 shows a block diagram of a system including a controller and a regulator.

FIG. 1 shows a block diagram of a system 100 including a controller 102 and a regulator 104. The system 100 may be any electronic system that performs computational operations. For example, the system 100 may be a low power system, such as a pedometer, among others. The controller 102 includes a control stage 106, a dynamic current scaling (DCS) stage 108, first and second memories 110, 112 and one or more registers 114. The regulator 104 may be any type of regulator, such as a low-dropout (LDO) regulator. The regulator 104 has an input for receiving an input current. The regulator 104 generates a voltage ($V_{REG}$) and provides the voltage, over an output of the regulator 104, to the controller 102. The voltage ($V_{REG}$) may power the controller 102. The control stage 106 is communicatively coupled to the DCS stage 108, the first and second memories 110, 112 and the one or more registers 114. It is noted that FIG. 1 shows an example of a controller that sets the current provided to the regulator 104. However, in alternative embodiments, different controller implementations may be used employ the techniques described herein. For example, the control may be implemented using hardware logic and registers. Further, the control may be implemented using an application-specific integrated circuit (ASIC) or ASIC coupled to an application processor.

The controller 102 may be any type of control device or circuit, such as a processor, microprocessor or a microcontroller. In addition, a system-on-chip (SOC) or an application-specific integrated circuit (ASIC) may be used in place of the controller 102 described herein. The control stage 106 may be any digital control circuit, such as an arithmetic logic unit (ALU), among others.

The first memory 110 may be any type of data storage device. The first memory 110 may be a non-volatile memory or a read-only memory (RAM). The first memory 110 may be an erasable programmable read-only memory (EPROM), electrically erasable programmable read-only memory (EE-PROM) or flash memory. The first memory 110 may store executable instructions that are executed by the controller 102 (or control stage 106 thereof). The executable instructions may be grouped in a plurality of algorithms 116a, 116b and a DCS algorithm 118. The algorithms 116a, 116b may, for example, be the firmware of the controller 102. The DCS algorithm 118 may be executable instructions for performing dynamic current scaling as described herein.

The second memory 112 may be any type of data storage device. The second memory 112 may be a random-access memory (ROM). The second memory 112 may be may be a volatile random-access semiconductor memory, such as a static random-access memory (SRAM) or a dynamic random-access memory (DRAM). The second memory 112 may store a threshold for activity duration and a window size parameter as described herein.

The one or more registers 114 may be any memory location for the storage of data. The one or more registers 114 may store an enable indicator. The enable indicator may indicate to the control stage 106 whether dynamic current scaling is configured. The control stage 106 may evaluate whether to perform dynamic current scaling when the enable indicator indicates that dynamic current scaling is configured, and the control stage 106 may refrain from evaluating whether to perform dynamic current scaling when the enable indicator indicates that dynamic current scaling is not configured. The one or more registers 114 may store an output data rate (ODR) frequency and a counter value, among others, as described herein. For example, the counter value may be the timestamp difference value described herein. The DCS stage 108 may be any circuit configured to receive a DCS setting from the control stage 106 and output a current setting to the regulator 104.

The DCS stage 108 may receive a DCS setting indicating that dynamic current scaling is to be performed. The DCS stage 108 lower a level of the current supplied to the regulator 104 during a standby duration of an output data rate period. The DCS stage 108 may receive a DCS setting indicating that dynamic current scaling is not to be performed. Accordingly, the DCS stage 108 may retain the level of the current supplied to the regulator 104 during the standby duration to the same current level used during a preceding activity duration. It is noted that when the enable indicator indicates that dynamic current scaling is not configured, the DCS setting may continuously indicate that dynamic current scaling is not to be performed. When the enable indicator indicates that dynamic current scaling is configured, the control stage 106 may set the DCS setting to indicate whether to perform dynamic current scaling on an output data rate period basis (e.g., at the end of an activity duration of an output data rate period).

Figure 2:
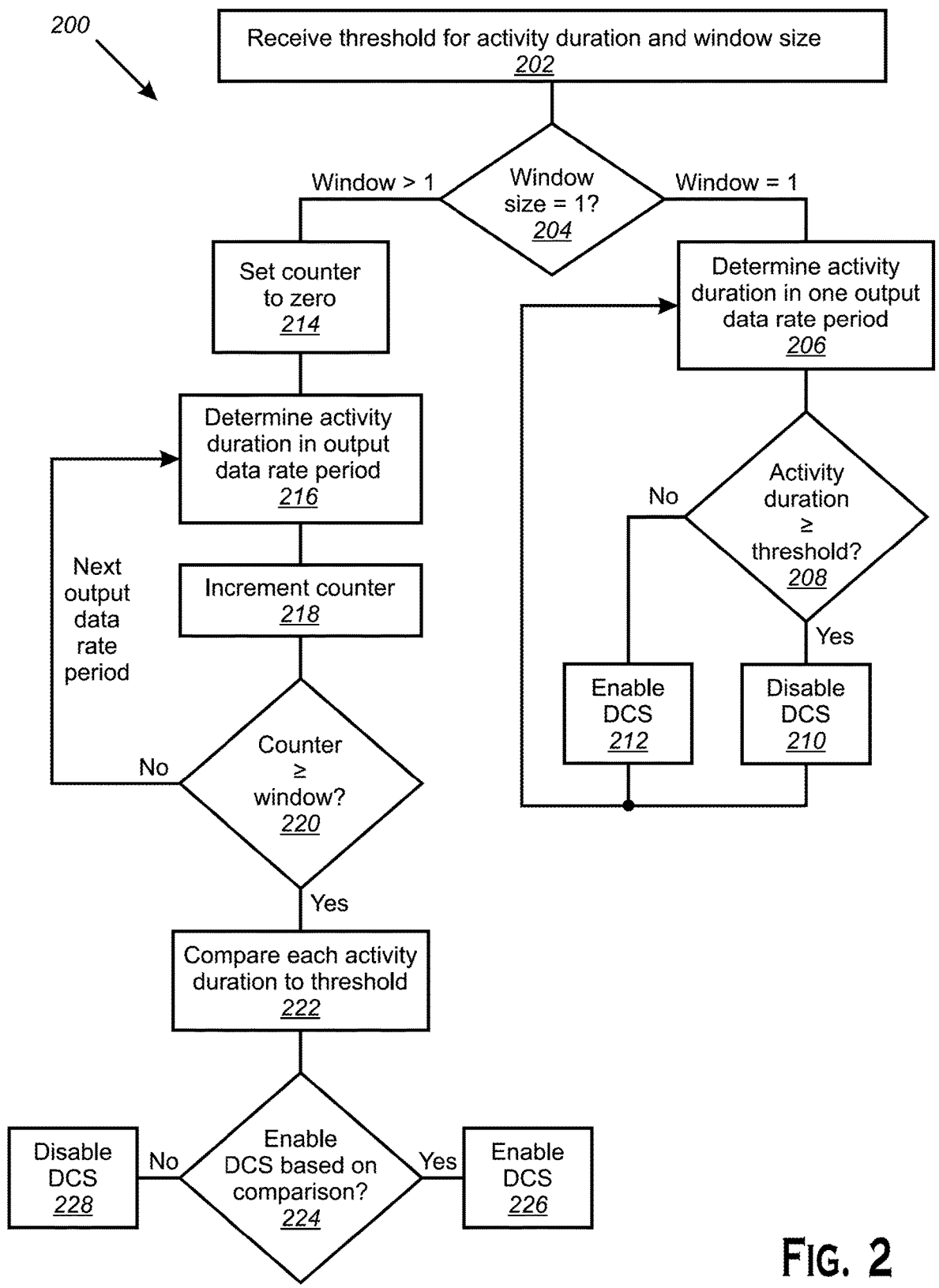
FIG. 2 shows a method for performing dynamic current scaling.

FIG. 2 shows a method 200 for performing dynamic current scaling. In the method 200, the control stage 106 receives, at 202, a threshold for activity duration and a window size. The threshold for the activity duration and the window size may be stored in the second memory 112. The control stage 106 may retrieve the threshold for the activity duration and the window size from the second memory 112. The control stage 106, at 204, determines whether the window size is one or greater than. A window size of one indicates that the control stage 106 is to perform dynamic current scaling on the basis of one output data rate period, whereas a window size that is greater one indicates that the control stage 106 is to evaluate dynamic current scaling on the basis of the number of output data rate periods specified by the window size.

In response to determining that the window size is one, the control stage 106, at 206, determines an activity duration within one output data rate period. The activity duration may be a length of time that elapses during control stage 106 execution of the plurality of algorithms 116a, 116b and the DCS algorithm 118. The activity duration may be part of the output data rate period. The plurality of algorithms 116a, 116b may be the computational load assigned, scheduled or slated for execution in the output data rate period. The control stage 106 may execute the DCS algorithm 118 after executing the plurality of algorithms 116a, 116b. Following execution of the plurality of algorithms 116a, 116b and the DCS algorithm 118, the control stage 106 may enter into standby in which the control stage 106 may not execute instructions or perform computational tasks. The control stage 106 may remain in standby until the end of the output data rate period. The control stage 106 resumes executing algorithms scheduled for the next output data rate period.

The control stage 106, at 208, determines whether the activity duration is greater than or equal to the threshold for the activity duration. If a positive determination is made and the activity duration is longer than or equal to the threshold, the control stage 106, at 210, refrains from enabling dynamic current scaling for the output data rate period. Conversely, if a negative determination is made and the activity duration is shorter than the threshold, the control stage 106, at 212, enables enabling dynamic current scaling for the output data rate period. The method 200 then reverts to 206, whereby the evaluation is performed for a subsequent or next output data rate period.

It is noted that in some applications in which the control stage 106 is used to perform computational functions, activity varies over time and over different output data rate periods. The control stage 106 selectively implements dynamic current scaling over an output data rate period depending on the activity duration in the output data rate period. Selectively implementing dynamic current scaling reduces current consumption in the system 100. For example, dynamic current scaling may result in reducing the current supplied to the regulator from a first current of 10 microampere (μA) to a second current of 6 μA.

Figure 3:
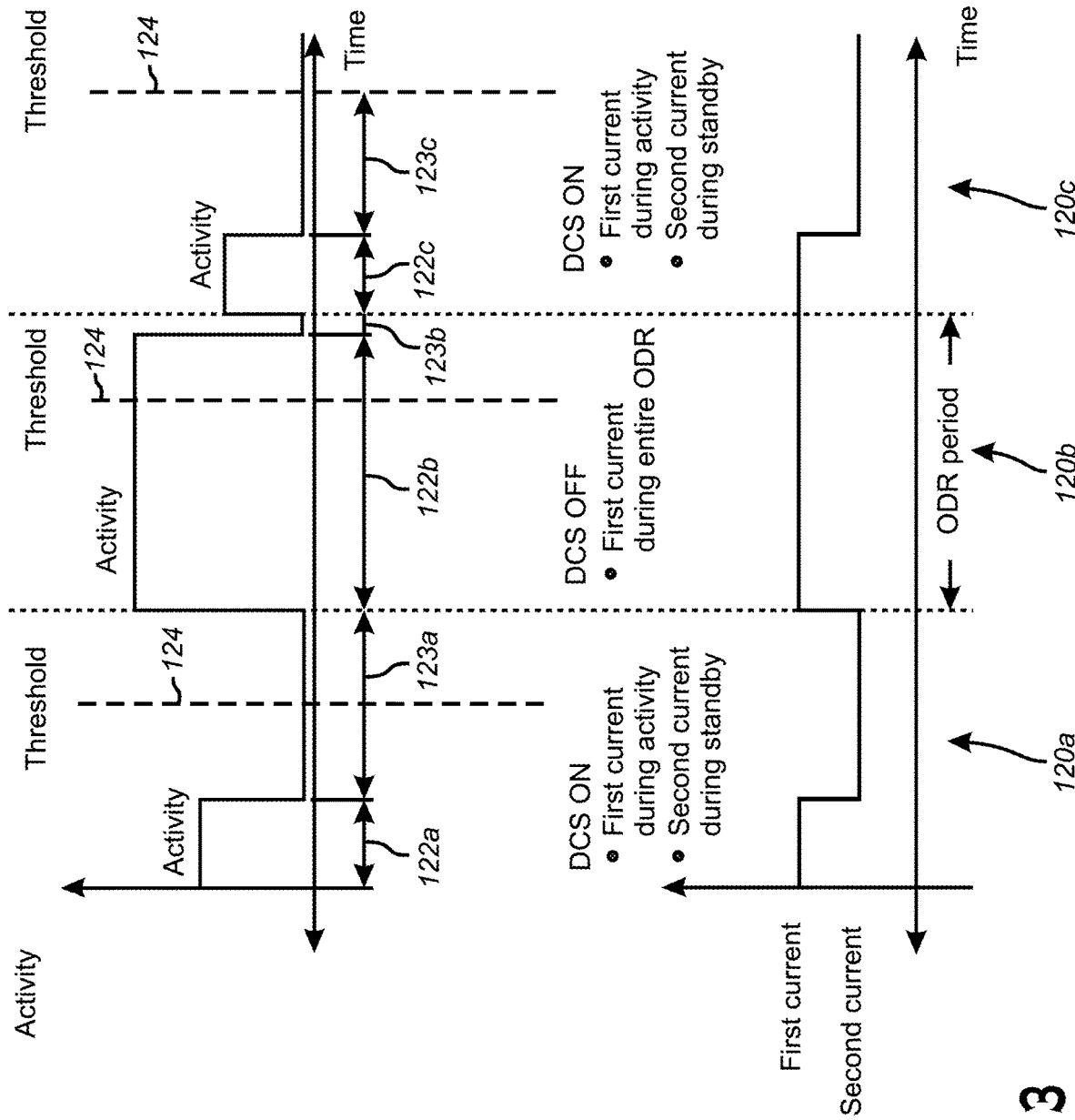
FIG. 3 shows an example of an application of dynamic current scaling in an output data rate period.

FIG. 3 shows an example of an application of dynamic current scaling in an output data rate period. First, second and third output data rate periods 120a, 120b, 120c have respective first, second and third activity durations 122a, 122b, 122c and first, second and third standby durations 123a, 123b, 123c. A threshold for the activity duration 128 is configured, for example, by user specification. A default value of the threshold for the activity duration 128 may be half of an output data rate period 120a, 120b, 120c. However, a user may specify the threshold for the activity duration 128 to be another value. In the first output data rate period 120a, the first activity duration 122a is less than the threshold for the activity duration 128. Thus, the control stage 106 enables dynamic current scaling for the first standby duration 123a of the first output data rate period 120a.

In response to enabling the dynamic current scaling, the dynamic current scaling stage 108 causes the current of the regulator 104 to be set to a first current during the first activity duration 122a and to be set to a second current, lower than the first current, for a remainder (e.g., the first standby duration 123a) of the first output data rate period 120a. During dynamic current scaling, the dynamic current scaling stage 108 reduces the current provided to the regulator 104 in response to (or following) conclusion of the first activity duration 122a. The current reduction remains in effect until the start of the next output data rate period.

The second output data rate period 120b follows the first output data rate period 120a. At the start of the second output data rate period 120b, the dynamic current scaling stage 108 returns the current level of the regulator 104 to the first current. The dynamic current scaling stage 108 keeps the regulator 104 current at the first current for the entirety of the second activity duration 122b. Dynamic current scaling for the second standby duration 123b of the second output data rate period 120b is evaluated based on the second activity duration 122b. The second activity duration 122b of the second output data rate period 120b is greater than the threshold for the activity duration 128. Thus, the control stage 106 disables dynamic current scaling. The dynamic current scaling stage 108 refrains from reducing the current supplied to the regulator 104 to the second current during the second standby duration 123b. As shown in FIG. 3, the regulator 104 is supplied with the first current for the second standby duration 123b of the second output data rate period 120b.

In the third output data rate period 120c, the dynamic current scaling stage 108 causes the first current to be output to the regulator 104 during the third activity duration 122c. Thus, the regulator 104 is supplied with higher current for performing computational algorithms described herein during the third activity duration 122c. The control stage 106 determines that the third activity duration 122c is less than the threshold for the activity duration 128. Thus, the control stage 106 enables dynamic current scaling. The dynamic current scaling stage 108 sets the current supplied to the regulator 104 to the second current for the third standby duration 123c.

The regulation and dynamic current scaling operates in a manner that mitigates electrical damage to the regulator 104 and the system 100 and at the same time reduces power consumption and power dissipation of the system 100. The regulation described herein refrains from changing (by lowering and then raising) the current supplied to the regulator when a standby duration 123a, 123b, 123c (during which the current is changed) is relatively short. That is due to the fact that lowering and then restoring the current may damage or compromise the regulator 104, the system 100 or electrical components thereof.

The control stage 106 avoids changing an input current to the regulator 104 or another configuration of the regulator 104 when a load, e.g., the controller 102, presented to the regulator 104 is not stable. The control stage 106 avoids changing the input current of the regulator 104 at the end of a standby phase and the beginning of a new activity phase (at the transition from a standby duration of a previous output data rate period to an new activity duration of a subsequent output data rate period). During the transition the load of regulator 104 changes, which can cause a drop in the voltage ($V_{REG}$). Furthermore, using a threshold value that is reasonably lower than ODR results in a more significant improvement in current consumption, which may not be accomplished by setting the threshold to a relatively large value.

The activity duration aids in determining the impact of applying dynamic current scaling on average current consumption of the regulator 104. A relatively long activity duration may not justify the application of dynamic current scaling due to the fact that the resulting improvement or decrease in average current consumption is minimal. Conversely, a relatively short activity duration signifies an opportunity for average current consumption reduction. Enabling dynamic current scaling when a relatively short activity duration is detected enables a more significant reduction in average current consumption.

Returning to FIG. 2, in response to determining, at 204, that the window size is greater than one, the control stage 106, at 214, sets a counter for the window size to zero. The control stage 106, at 216, determines an activity duration in an output data rate period as described herein. The control stage 106, at 218, increments the counter, for example, by one. The control stage 106, at 220, determines whether the counter reached the window size. In response to determining that the counter has not reached the window size, the control stage 106 proceeds to determining the activity duration of a next output data rate period until the number of output data rate periods for which the activity duration is determined reaches the window size.

In response to determining that the counter has reached the window size, the control stage 106, at 222, compares each activity duration of the activity durations within the window to the threshold. The control stage 106, at 224, determines whether to enable dynamic current scaling based comparing the activity durations within the window to the threshold. The control stage 106 either enables the dynamic current scaling at 224 or disables the dynamic current scaling at 226 based on comparing each activity duration of the activity durations within the window to the threshold.

For example, the control stage 106 may enable the dynamic current scaling if all activity durations within the window are shorter than the threshold. If at least one activity duration within the window is equal to or longer than the threshold, the control stage 106 may disable the dynamic current scaling. If the control stage 106 determines to enable the dynamic current scaling, the current of the regulator 104 is lowered in a last output data rate period of the window. Further, the control stage 106 may lower the current for all subsequent output data rate periods, whereby the subsequent output data rate periods may include or exclude the last output data rate period of the window. The control stage 106 may lower the current for selected or set number of output data rate periods (for example, user selected or set), whereby the number of output data rate periods may include or exclude the last output data rate period of the window. The control stage 106 may refrain from enabling the dynamic current scaling in prior output data rate periods in the window.

Figure 4:
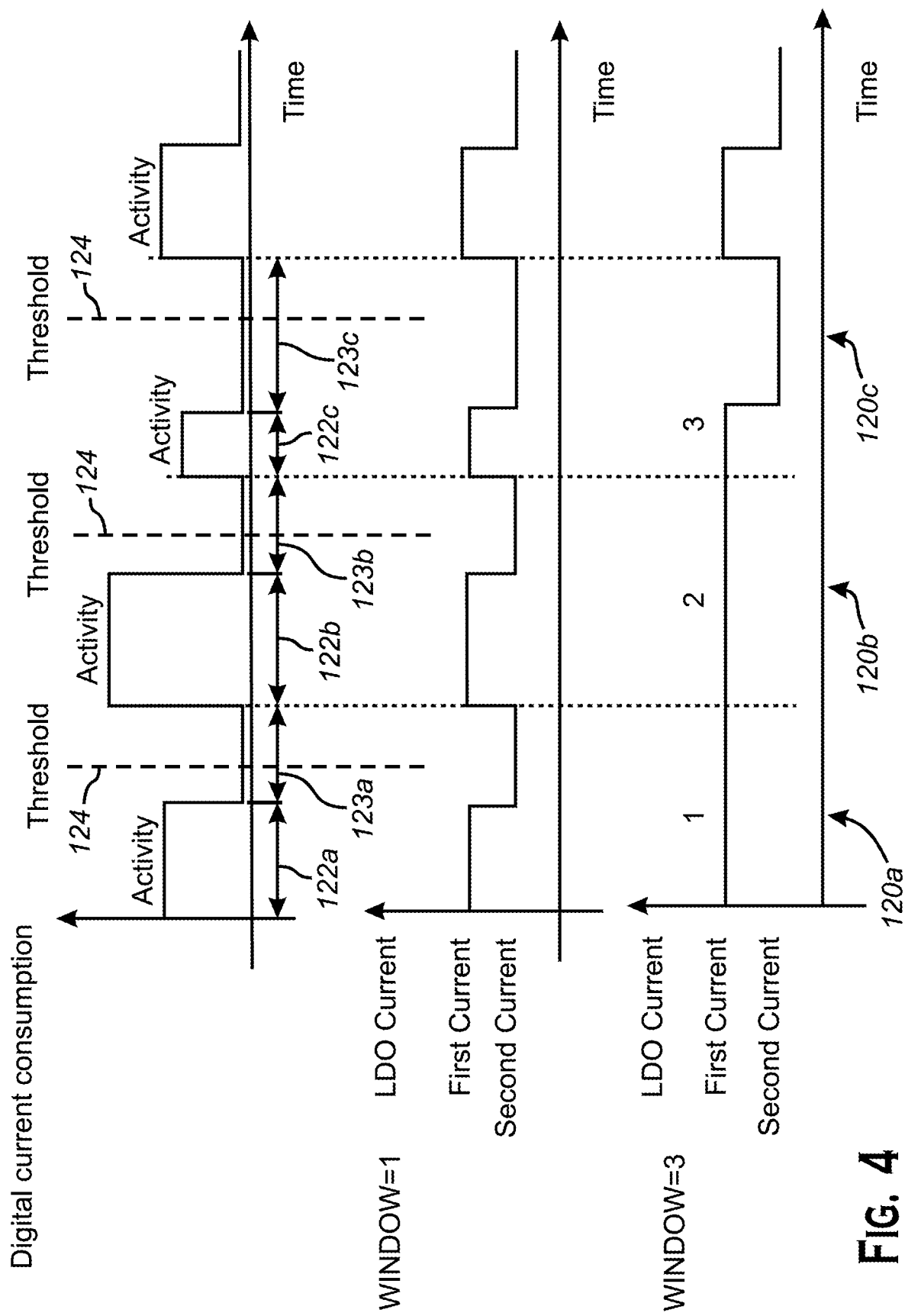
FIG. 4 shows an example of an application of dynamic current scaling in output data rate periods.

FIG. 4 shows an example of an application of dynamic current scaling in output data rate periods. First, second and third output data rate periods 120*a*, 120*b*, 120*c* have respective first, second and third activity durations 122*a*, 122*b*, 122*c* and respective first, second and third standby durations 123*a*, 123*b*, 123*c*. A threshold for the activity duration 128 is configured, for example, by user specification. When the window size is one, the control stage 106 determines whether to enable dynamic current scaling in a standby duration 123 of an output data rate period 120 based on whether the activity duration 122 in the same output data rate period 120 is the same as or exceeds the threshold for the activity duration 128. Because the first, second and third activity durations 122*a*, 122*b*, 122*c* are each shorter than the threshold for the activity duration 128, the control stage 106 determines to enable dynamic current scaling in each of the standby durations 123*a*, 123*b*, 123*c* of the first, second and third activity durations 122*a*, 122*b*, 122*c*.

Conversely, when the window size is greater than one, the control stage 106 determines whether to apply the dynamic current scaling to a last output data rate period of the output data rate periods included in the window size. As shown in FIG. 4, the window size is three and includes the first, second and third output data rate periods 120*a*, 120*b*, 120*c*. The control stage 106 determines whether to perform dynamic current scaling in the third output data rate period 120*c* based on whether the first, second and third activity durations 122*a*, 122*b*, 122*c* (of the first, second and third output data rate periods 120*a*, 120*b*, 120*c*) are each shorter than the threshold for the activity duration 128. The first, second and third activity durations 122*a*, 122*b*, 122*c* are each shorter than the threshold 128. Thus, the control stage 106 performs dynamic current scaling in the third output data rate period 120*c*. The control stage 106 causes the current supplied to the regulator to decrease from the first current to the second current during the third standby duration 123*c* and during the standby durations of subsequent output data rate periods.

Figure 5:
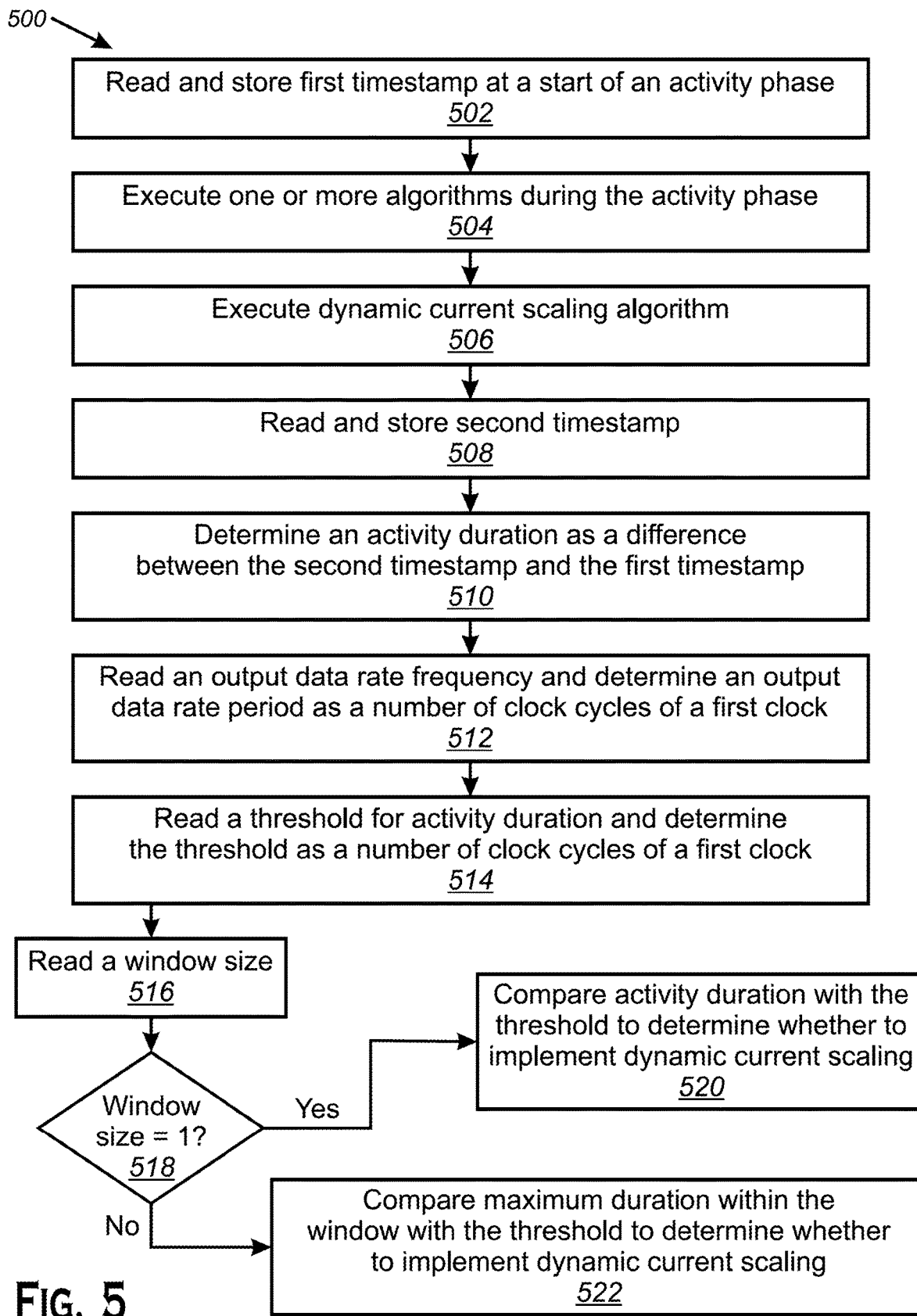
FIG. 5 shows a method for performing dynamic current scaling.

FIG. 5 shows a method 500 for performing dynamic current scaling. In the method, the control stage 106, at 502, reads and stores a first timestamp at a start of an activity phase. The first timestamp may be a period number of a first clock. The first clock may be a faster clock than an output data rate clock, whereby the output data rate period may be in accordance with the output data rate clock. The control stage 106 may store the first timestamp in the one or more registers 114. The control stage 106 may read the first timestamp before beginning to execute the algorithms 116 scheduled or slated for execution during an output data rate period or activity duration thereof.

The control stage 106, at 504, executes one or more algorithms 116 during the activity phase. The DCS algorithm 118 may be appended to an end of the one or more algorithms 116 and scheduled or slated for execution during the output data rate period. After executing the one or more algorithms 116, the control stage 106, at 506, executes the dynamic current scaling algorithm. The same dynamic current scaling algorithm may be appended to the algorithms scheduled for execution during various output data rate periods. The control stage 106, at 508, reads and stores a second timestamp. The control stage 106 may store the second timestamp in the one or more registers 114.

The control stage 106, at 510, determines the activity duration for the output data rate period as a difference between the second timestamp and the first timestamp. The activity duration may be in units of clock cycles of the first clock. The first clock may be an internal clock of the control stage 106. The control stage 106, at 512, reads an output data rate frequency and determines the output data rate period as a number of clock cycles of the first clock. The output data rate frequency may be stored in the one or more registers 114. The output data rate frequency may be an integer fraction of a frequency of the first clock, and the output data rate period may be an integer multiple of a period of the first clock.

The control stage 106, at 514, reads the threshold for activity duration and determines the threshold as a number of clock cycles of a first clock. The threshold may be stored in the second memory 112, which may be a RAM. The threshold may also be in units of clock cycles of the first clock. For example, the output data rate period may be 16 times the period of the first clock, and the threshold may be 8 to represent half the output data rate period.

The second memory 112 may store user-configured parameters, such as the threshold and the window size. The control stage 106, at 516, reads the window size, for example, from the second memory 112. The control stage 106, at 518, determines whether the window size is one. In response to determining that the window size is one, the control stage 106, at 520, compares the activity duration with the threshold to determine whether to implement dynamic current scaling. In response to determining that the window size greater than one, the control stage 106, at 522, compares a maximum activity duration within the window with the threshold to determine whether to implement dynamic current scaling. For example, if the activity duration is five periods of the first clock and the threshold is eight periods of the first clock, then the control stage 106 may implement dynamic current scaling. Conversely, if the activity duration is ten periods of the first clock and the threshold is eight periods of the first clock, then the control stage 106 may refrain from implementing dynamic current scaling.

It is noted that the control stage 106 may include the execution time of the DCS algorithm 118 in the activity duration. Because the control stage 106 determines the activity duration before completing the execution of the DCS algorithm 118, a remaining execution time of the DCS algorithm 118 may be added to the second timestamp. The remaining execution time of the DCS algorithm 118 may be known and/or predetermined and may not change from one execution to another. The execution time of the DCS algorithm 118 may be relatively small compared to the execution time of the plurality of algorithms 116a, 116b. The threshold for the activity duration may be modified to account for the execution time of the DCS algorithm 118. The threshold for the activity duration may be increased to account for the execution time of the DCS algorithm 118 and become reflective of the execution time of the plurality of algorithms 116a, 116b.

Figure 6:
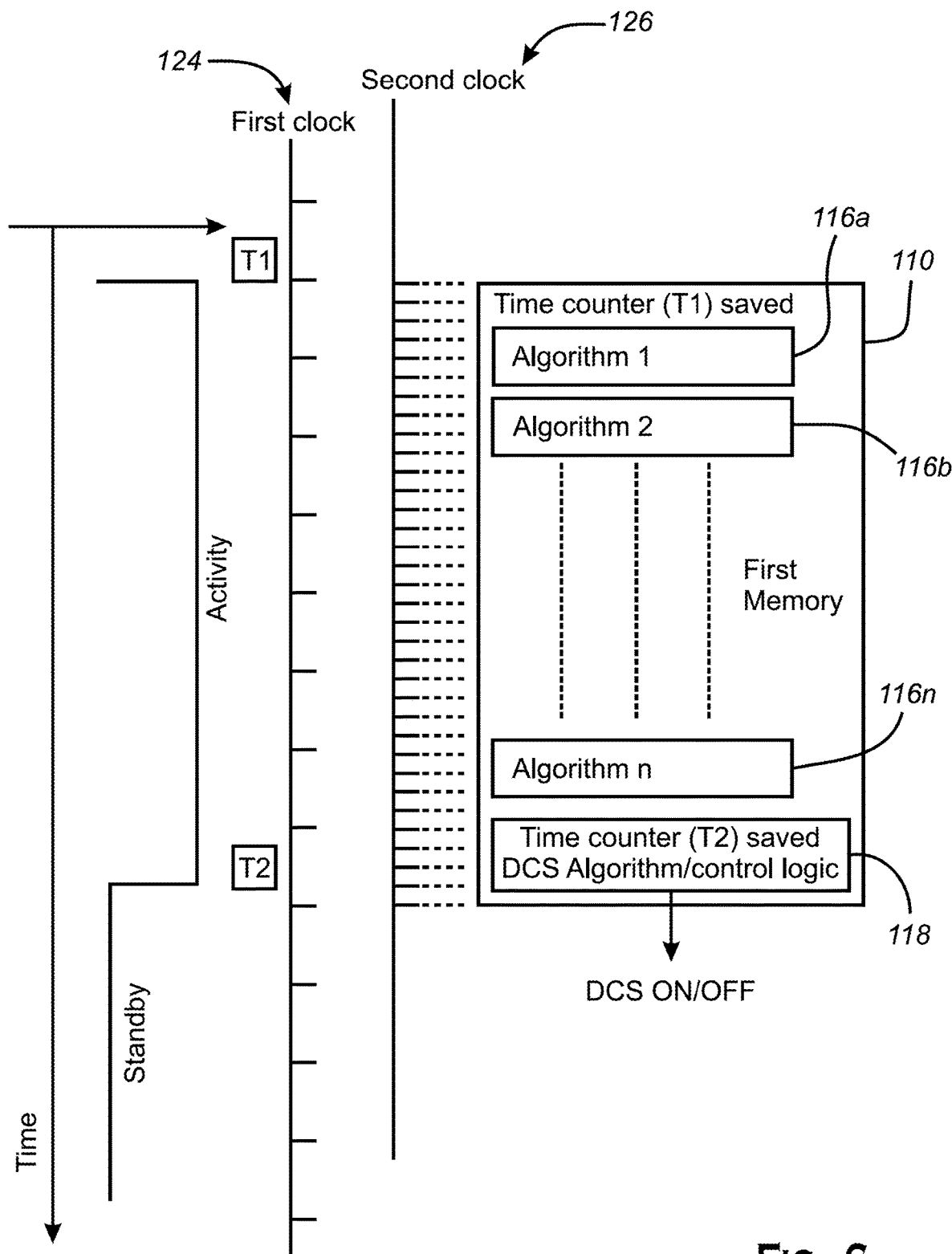
FIG. 6 shows an example of determining activity duration.

FIG. 6 shows an example of determining activity duration. The first memory 110 stores a plurality of algorithms 116a, 116b, . . . , 116n for execution during an output data rate period. The plurality of algorithms 116a, 116b, . . . , 116n may be executed in sequential order. The first memory 110 also stores a DCS algorithm 118 for execution by the control stage 106 after the plurality of algorithms 116a, 116b, . . . , 116n. The control stage 106 has first and second clocks 124, 126, which may have a different frequency than the output data rate frequency. Before or at a time when the control stage 106 begins executing a first algorithm 116a of the plurality of algorithms 116a, 116b, . . . , 116n, the control stage 106 determines and stores a first timestamp (T1). After the control stage 106 completes executing a last algorithm 116n of the plurality of algorithms 116a, 116b, . . . , 116n, the control stage 106 determines and stores a second timestamp (T2). The first timestamp (T1), the second timestamp (T2) and threshold for the activity duration may each be counts or counter values of clock cycles of the first clock 124.

It is noted that in some embodiments, computational activity varies over time and over different cycles or output data rate periods. During computationally intensive periods, the regulator 104 experiences drops in the voltage ($V_{REG}$). To reduce the voltage recovery time, the current supplied to the regulator is retained at a higher level and not reduced.

Tuning current consumption for various applications is described herein. A duration of an activity phase in which various algorithms are executed is determined. Dynamic current scaling of a regulator is activated if the activity duration is shorter than a threshold, which may be programmable.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a regulator configured to receive an input current and provide a regulated voltage; and
a controller configured to:
receive a threshold for an activity duration;
determine a first activity duration in a first output data rate period of a plurality of output data rate periods;
compare the first activity duration with the threshold for the activity duration;
in response to determining that the first activity duration exceeds the threshold, refrain from performing dynamic current scaling on the input current in the first output data rate period; and
in response to determining that the first activity duration does not exceed the threshold, cause the dynamic current scaling to be performed on the input current in the first output data rate period.

2. The system as claimed in claim 1, wherein the controller is configured to cause the dynamic current scaling to be performed in the first output data rate period by reducing the input current from a first current level to a second current level that is lower than the first current level.

3. The system as claimed in claim 2, wherein the controller is configured to cause the dynamic current scaling to be performed in the first output data rate period by reducing the input current from the first current level to the second current level in a first standby duration of the first output data rate period, wherein the first standby duration is subsequent to the first activity duration in the first output data rate period.

4. The system as claimed in claim 3, wherein the first standby duration is a portion of the first output data rate period during which the controller does not perform one or more algorithm scheduled during the first output data rate period.

5. The system as claimed in claim 1, wherein the first activity duration is a portion of the first output data rate period during which the controller performs one or more algorithm scheduled during the first output data rate period.

6. The system as claimed in claim 1, wherein the controller is configured to refrain from performing the dynamic current scaling by retaining the input current at a first current level during both the first activity duration and a first standby duration of the first output data rate period.

7. The system as claimed in claim 1, wherein the controller is configured to:
receive an indication of a window size;
determine that the window size is greater than one;

in response to determining that the window size is greater than one, determine whether one or more activity durations of one or more output data rate periods, respectively, of the plurality of output data rate periods each do not exceed the threshold; and in response to determining that the one or more activity durations and the first activity duration each do not exceed the threshold, cause the dynamic current scaling to be performed on the input current in the first output data rate period and/or subsequent output data rate periods following the plurality of output data rate periods, wherein the first output data rate period is subsequent to the one or more output data rate periods.

8. The system as claimed in claim 1, wherein the regulated voltage powers the controller.

9. A controller for a regulator, comprising:
memory configured to store executable instructions for execution during a first activity duration of a first output data rate period;
control stage configured to:
receive a threshold for activity duration;
determine a first timestamp before executing the executable instructions;
execute the executable instructions;
determine a second timestamp after executing the executable instructions;
determine the first activity duration as a difference between the first and second timestamps;
compare the first activity duration with the threshold; and
determine whether to reduce a current supplied to the regulator based on comparing the first activity duration with the threshold; and
a dynamic current scaling stage configured to set the current supplied to the regulator.

10. The controller as claimed in claim 9, wherein the control stage is configured to reduce the current supplied to the regulator from a first current level to a second current level in response to determining that the first activity duration is less than the threshold.

11. The controller as claimed in claim 10, wherein the control stage is configured to reduce the current supplied to the regulator in a first standby duration of the first output data rate period, wherein the first standby duration is subsequent to the first activity duration.

12. The controller as claimed in claim 11, wherein the dynamic current scaling stage is configured to increase the current supplied to the regulator in a second activity duration of a second output data rate period from the second current level to the first current level, wherein the second output data rate period is subsequent to the first output data rate period.

13. The controller as claimed in claim 9, wherein the control stage is configured to retain a level of the current supplied to the regulator in response to determining that the first activity duration is greater than the threshold.

14. The controller as claimed in claim 13, wherein the control stage is configured to retain the level of the current supplied to the regulator in a first standby duration of the first output data rate period, wherein the first standby duration is subsequent to the first activity duration.

15. A method, comprising:
receiving a threshold for an activity duration;
determining a first activity duration in a first output data rate period of a plurality of output data rate periods;
comparing the first activity duration with the threshold for the activity duration; and
in response to determining that the first activity duration exceeds the threshold, refraining from performing dynamic current scaling on an input current of a regulator in the first output data rate period, and in response to determining that the first activity duration does not exceed the threshold, causing the dynamic current scaling to be performed on the input current in the first output data rate period.

16. The method as claimed in claim 15, wherein causing the dynamic current scaling to be performed in the first output data rate period includes reducing the input current from a first current level to a second current level that is lower than the first current level.

17. The method as claimed in claim 16, wherein causing the dynamic current scaling to be performed in the first output data rate period includes reducing the input current from the first current level to the second current level in a first standby duration of the first output data rate period, wherein the first standby duration is subsequent to the first activity duration in the first output data rate period.

18. The method as claimed in claim 15, wherein the first activity duration is a portion of the first output data rate period during which a controller executes one or more algorithm scheduled for execution during the first output data rate period.

19. The method as claimed in claim 15, wherein refraining from performing the dynamic current scaling includes retaining the input current at a first current level during both the first activity duration and a first standby duration of the first output data rate period.

20. The method as claimed in claim 15, wherein comprising:
receiving an indication of a window size;
determining that the window size is greater than one;
in response to determining that the window size is greater than one, determining whether one or more activity durations of one or more output data rate periods, respectively, of the plurality of output data rate periods each do not exceed the threshold; and
in response to determining that the one or more activity durations and the first activity duration each do not exceed the threshold, causing the dynamic current scaling to be performed on the input current in the first output data rate period and/or subsequent output data rate periods following the plurality of output data rate periods, wherein the first output data rate period is subsequent to the one or more output data rate periods.

* * * * *